(12) United States Patent
Hirano (10) Patent No.: US 8,138,887 B2
(45) Date of Patent: Mar. 20, 2012

(54) VALET KEY STORAGE DEVICE

(75) Inventor: Morimichi Hirano, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 836 days.

(21) Appl. No.: 12/244,682

(22) Filed: Oct. 2, 2008

(65) Prior Publication Data

US 2009/0091421 A1 Apr. 9, 2009

(30) Foreign Application Priority Data

Oct. 3, 2007 (JP) .................................. 2007-259743

(51) Int. Cl.
*B60R 25/00* (2006.01)

(52) U.S. Cl. ........... 340/5.73; 340/5.7; 340/5.6; 70/387; 70/388; 70/389

(58) Field of Classification Search .................. 340/5.22, 340/5.73, 5.7, 5.6, 572.1; 70/252, 387, 388, 70/389
See application file for complete search history.

(56) References Cited

U.S. PATENT DOCUMENTS

| | | | | |
|---|---|---|---|---|
| 3,851,505 | A * | 12/1974 | Wilkinson | 70/255 |
| 5,513,105 | A * | 4/1996 | Krones | 701/48 |
| 6,518,882 | B2 * | 2/2003 | Reese et al. | 340/539.1 |
| 6,810,309 | B2 * | 10/2004 | Sadler et al. | 701/1 |
| 6,897,767 | B2 * | 5/2005 | Kim | 340/426.35 |
| 7,634,932 | B2 * | 12/2009 | Cadiz et al. | 70/456 R |
| 7,897,888 | B2 * | 3/2011 | Dimig | 200/302.2 |
| 7,930,915 | B2 * | 4/2011 | Katagiri | 70/252 |
| 8,011,214 | B2 * | 9/2011 | Katagiri et al. | 70/252 |
| 2001/0033221 | A1 * | 10/2001 | Thomas et al. | 340/5.61 |
| 2008/0100418 | A1 * | 5/2008 | Stobbe et al. | 340/5.73 |

FOREIGN PATENT DOCUMENTS

JP 2006-225976 A 8/2006
JP 2007-32123 A 2/2007

OTHER PUBLICATIONS

Office Action dated Mar. 8, 2010 issued by the Chinese Patent Office in corresponding Chinese Patent Application No. 2008101682618.

* cited by examiner

*Primary Examiner* — Benjamin C Lee
*Assistant Examiner* — Peter Mehravari
(74) *Attorney, Agent, or Firm* — Roberts Mlotkowski Safran & Cole, P.C.

(57) ABSTRACT

A valet key storage device includes a valet key storage portion for storing a valet key on which an engaging portion is formed, a locking portion provided with a locking mechanism for locking an ejection of the valet key by engaging with the engaging portion of the valet key, a key cylinder conducting a release operation of the locking mechanism by a mechanical key, and a control section for controlling an unlocking operation of the locking portion based on a release operation of an immobilizing function and the key cylinder by the mechanical key.

10 Claims, 7 Drawing Sheets

VALET KEY STORAGE DEVICE

The present application is based on Japanese Patent Application No. 2007-259743 filed on Oct. 3, 2007, the entire contents of which are incorporated herein by reference.

BACKGROUND OF THE INVENTION

1. Field of the Invention

The present invention relates to a valet key storage device in which a valet key can be securely stored in a vehicle.

2. Related Art

There are vehicle families which provide two kinds of key, one of which is a master key used by a driver for driving and another is a valet key. The valet key is used, for example, for depositing a vehicle by passing a key to a valet parking attendant of a hotel and entrusting him to move the vehicle to the parking etc. Both of the master key and the valet key can be used for unlocking or locking doors of the vehicle and starting up an engine. Furthermore, it is possible to unlock or lock a trunk or a glove box with the master key, but not with the valet key.

As for key types of a master key and a valet key, there is a key type with a key groove and key teeth which is inserted into a door and a cylinder of an engine start switch, and another key type having an immobilizing function (immobilizer) in which the security against a theft or the like is enhanced by communicating with the engine start switch wirelessly.

A key having the immobilizing function is a system with an IC chip called a transponder incorporated in a key or a portable device, letting the transponder to transmit an ID code when bringing the key or the portable device close to an engine start switch, permitting the engine to start up when the ID code of the transponder and an ID code on a vehicle side match, and staring up the engine by subsequently pressing a push button of the engine start switch.

A keyless system which activates a function of a valet key provided with the immobilizing function has been proposed, for example, there is a method for setting up a valet mode by an owner activating a mechanical lock of the vehicle with a mechanical key.

Furthermore, there is a smart keyless system disclosed by JP-A 2006-225976 in which it is not necessary to carry two of the master key and the valet key individually and also the security is enhanced, and in this system, a separating piece (tongue) incorporating a transponder in the portable device provided with a mechanical key is provided removably, a tongue isolation signal which indicates the separation of the tongue is transmitted with an ID signal from the portable device when passing the portable device to a valet parking attendant after detaching this tongue, and the valet mode is set up on the vehicle side.

However, according to a conventional smart keyless system, although it is possible to use the portable device separately for the master key and the valet key by attaching and removing the tongue, since there is no secure space to store a valet key in a conventional vehicle, it is necessary to carry around an extra key. Furthermore, when separating the tongue from the portable device, the appearance is not good due to a notched area on a portion of the portable device and it is also difficult to deal with it when storing.

THE SUMMARY OF THE INVENTION

Therefore, it is an object of the invention to provide a valet key storage device by which a driver does not need to carry around an extra key and it is possible to store the dedicated valet key in the vehicle securely.

[1] According to the present invention, a valet key storage device comprises:

a valet key storage portion for storing a valet key on which an engaging portion is formed;

a locking portion provided with a locking mechanism for locking an ejection of the valet key;

a key cylinder conducting a release operation of the locking mechanism by a mechanical key; and a control section for controlling an unlocking operation of the locking portion based on a release operation of an immobilizing function and the key cylinder by the mechanical key.

[2] The locking portion may have a locking bar provided corresponding to the engaging portion of the valet key so as to lock an ejection of the valet key from the valet key storage portion by entering the engaging portion of the valet key when the valet key is stored in the valet key storage portion, and a driving section for driving the locking bar.

[3] Furthermore, a concave portion or an opening portion which can be hooked onto a projection body may be formed as the engaging portion on the valet key.

[4] Furthermore, the control section may control the driving section when an ID possessed by a regular key of a vehicle and an ID of the vehicle are certified by the immobilizing function, and permits the ejection of the valet key from the valet key storage portion.

[5] Furthermore, the driving section may be an actuator in which a solenoid is used.

EFFECT OF THE INVENTION

According to the valet key storage device of the present invention, a driver does not need to carry around an extra valet key and it is possible to store the dedicated valet key in the vehicle securely

BRIEF DESCRIPTION OF THE DRAWINGS

Next, the present invention will be explained in more detail in conjunction with appended drawings, wherein:

FIGS. 5A and 5B are cross sectional views of the valet key storage device in the first preferred embodiment according to the present invention, wherein FIG. 5A is before an ID certification and FIG. 5B is after the ID certification;

DESCRIPTION OF THE PREFERRED EMBODIMENTS

First Preferred Embodiment

A valet key storage device in the first preferred embodiment according to the present invention will be explained in more detail in conjunction with the appended drawings.

(Structure of Vehicle 1)

Figure 1:
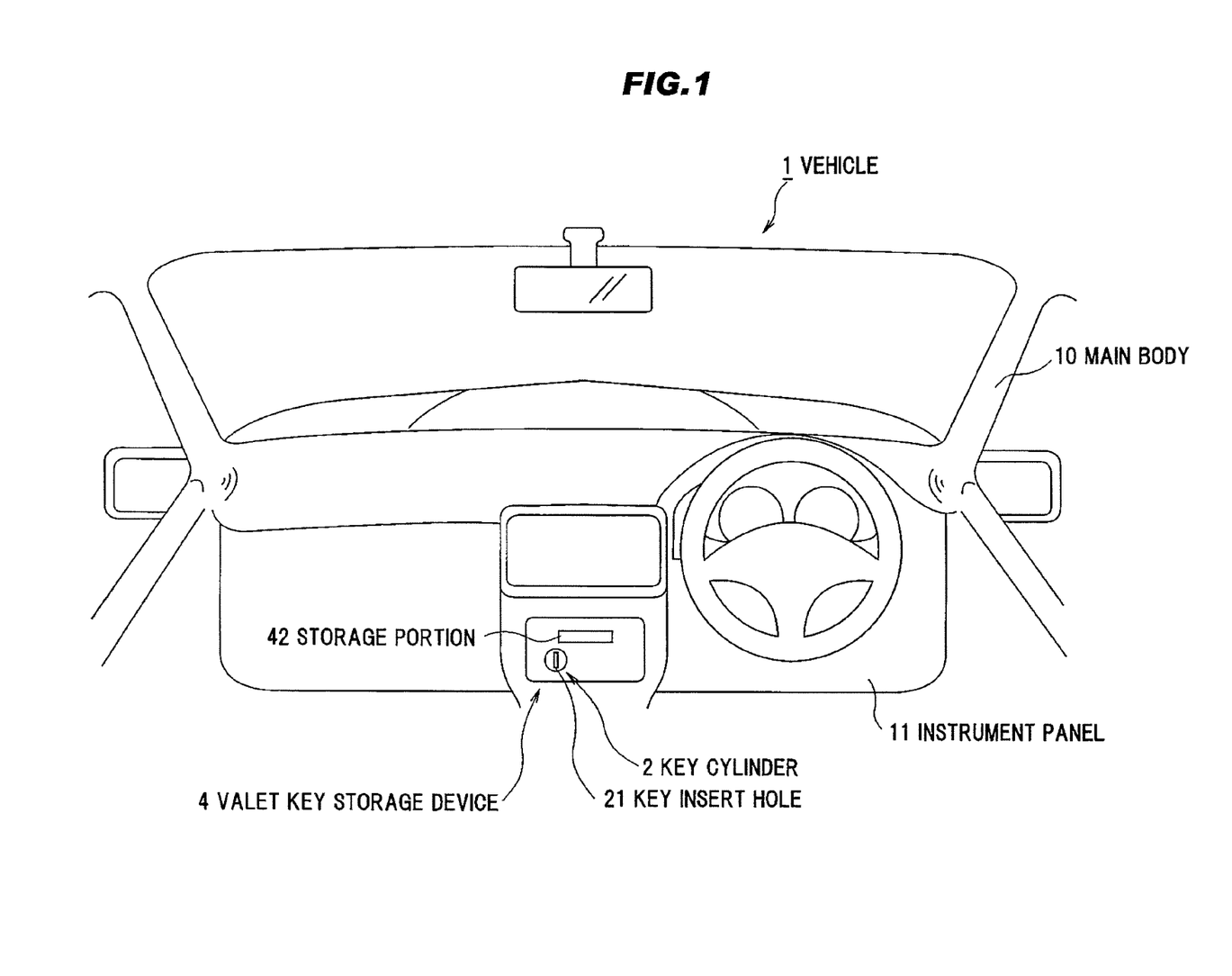
FIG. 1 is a schematic view of the inside of a vehicle in a first preferred embodiment according to the present invention.

FIG. 1 is a schematic view of the inside of a vehicle in a first preferred embodiment according to the present invention. A vehicle 1 has a main body 10 mounting an engine and an ECU (Electronic Control Unit) as a control section or the like and an instrument panel 11 to which various switches or the like are installed. A valet key storage device 4 is provided with a storage portion 42 and a key insert hole 21 of a key cylinder 2 is mounted on the instrument panel 11. A cylinder switch 22 for outputting a signal to take out a valet key from the valet key storage device 4 operated by a regular key is mounted on the key cylinder 2.

In the vehicle 1, a normal mode and a valet mode are switchable, and the normal mode permits to conduct all operations in the vehicle 1 using a regular key, for example, startup of the engine, locking and unlocking of a trunk, groove box or the like. Meanwhile, the valet mode is set up by the ECU which controls the vehicle 1 so that, for example, only startup/stop of the engine of the vehicle 1 and locking/unlocking of a door lock of the vehicle 1 are conducted by the below-described valet key. It is necessary to match the ID of the regular key and the ID of the vehicle 1 for shifting to the valet mode.

(Structure of the Valet Key Storage Device 4)

Figure 2:
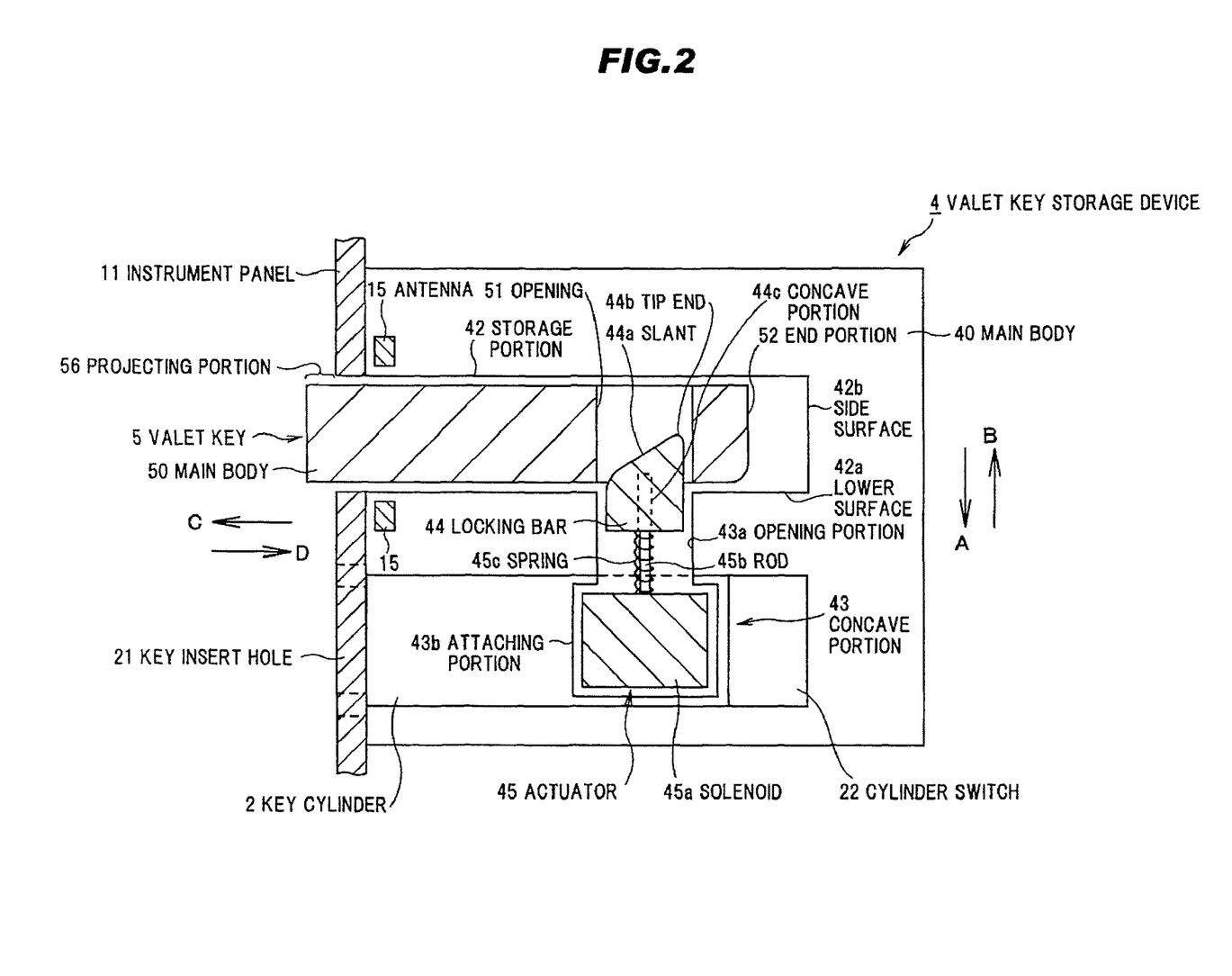
FIG. 2 is a cross sectional view of a valet key storage device in the first preferred embodiment according to the present invention.
Figure 3:
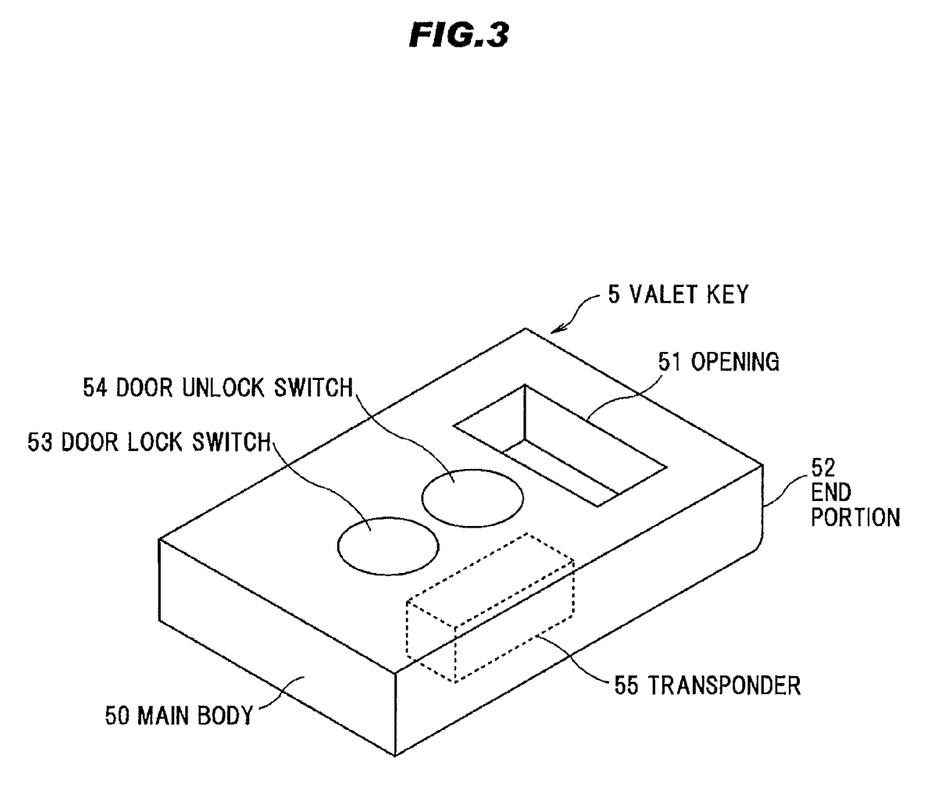
FIG. 3 is a perspective view of a valet key in the first preferred embodiment according to the present invention.
Figure 4:
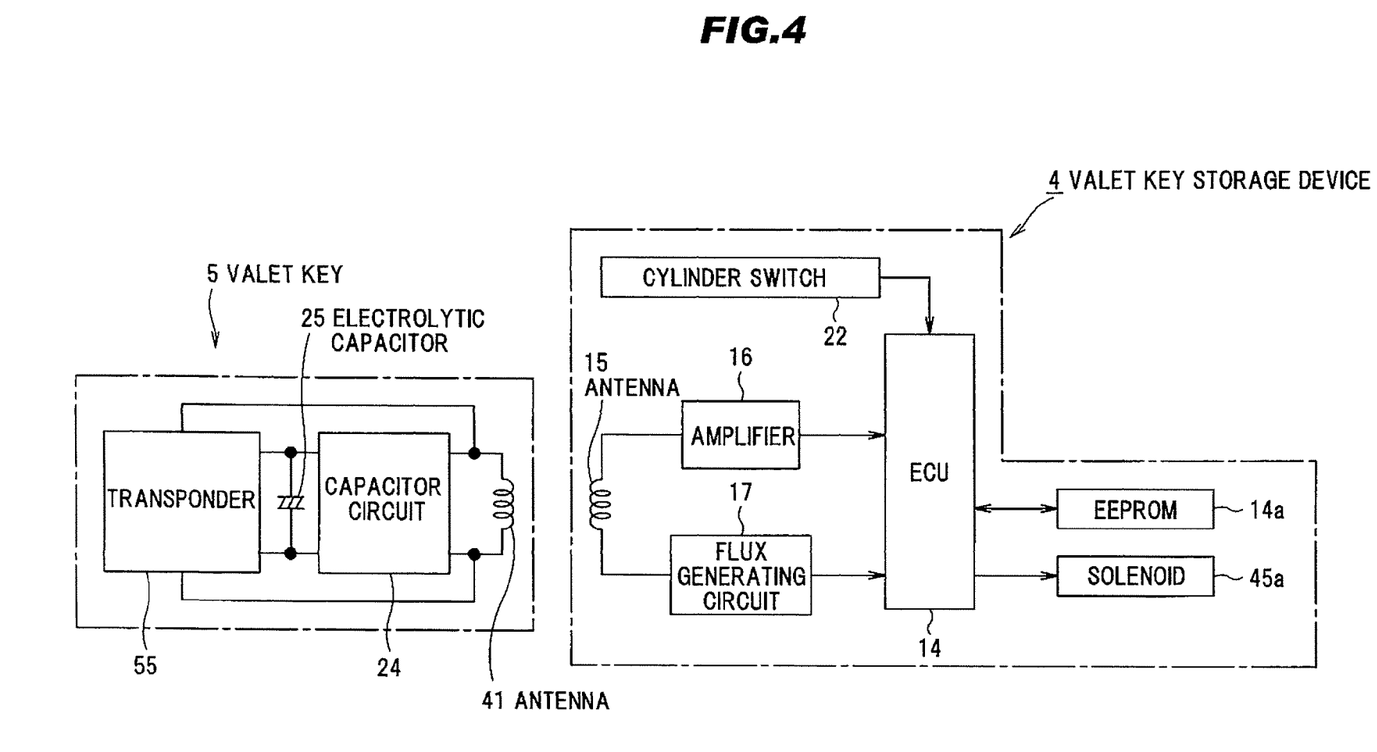
FIG. 4 is a block diagram in respect to the valet key storage device in the first preferred embodiment according to the present invention.

FIG. 2 is a cross sectional view of the valet key storage device in the first preferred embodiment according to the present invention, FIG. 3 is a perspective view of a valet key in the first preferred embodiment according to the present invention and FIG. 4 is a block diagram in respect to the valet key storage device in the first preferred embodiment according to the present invention.

The valet key storage device 4 is schematically configured to comprise a valet key storage portion 4 for storing a valet key 5 on which an opening 51 is formed as an engaging portion, a locking portion provided with a locking mechanism composed of a locking bar 44 for locking an ejection of the valet key 5 or the like, a key cylinder 2 activated by a mechanical key and provided with a cylinder switch 22 for outputting a release signal to release the locking mechanism and an ECU 14 as a control section for controlling an unlocking operation of the locking portion based on the release signal of the immobilizing function and the key cylinder 2.

Furthermore, the valet key storage device 4 is schematically configured to comprise the main body 40 formed of a resin material or a metallic material in which the storage portion 42 and a concave portion 43 are formed, an antenna 41 provided near the storage portion 42 of the main body 40 for communicating with a regular key 3 and a valet key 5, and the concave portion 43 for storing the actuator 45.

For example, the storage portion 42 is in a rectangular shape and has a lower surface 42a which is a surface parallel to a direction to insert the valet key 5, namely, a direction indicated by an arrow D in shown FIG. 2 and a side surface 42b which is a surface vertical to the arrow D direction, furthermore, the concave portion 43 is provided on the lower surface 42a. The concave portion 43 is provided with an opening portion 43a in which the locking bar 44 can be displaced freely inertable to the storage portion 42 and an attaching portion 43b to which a below-described solenoid is installed.

(Structure of the Locking Bar 44)

The locking bar 44 has, for example, a substantially cylindrical shape, formed of a resin material or a metallic material and is configured to comprise a slant 44a, a tip end 44b and a concave portion 44c. The slant 44a is provided for storing the valet key 5 in the storage portion 42 smoothly by contacting with an end portion 52 of the valet key 5 and converting a force in the arrow D direction into a force in an arrow A direction when storing the valet key 5 in the storage portion 42. Furthermore, the concave portion 44c is formed at a substantially center of the locking bar 44 since one end of a rod 45b is fitted and fixed.

(Structure of the Actuator 45)

The actuator 45 is schematically configured to comprise a solenoid 45a for driving the rod 45b using a non-illustrated magnetic body and a magnet coil, and a spring 45c arranged around the rod 45b for applying an spring load to the locking bar 44 in an arrow 13 direction. The rod 45b is configured to be stored inside the solenoid 45a when driving the solenoid 45a in the arrow A direction.

(Structure of the Valet Key 5)

The valet key 5 is schematically configured to comprise a main body 50 mounting electronic components such as a non-illustrated battery, a transponder 55 or the like, an opening 51 formed on the main body 50 and allowing a key holder, accessories or the like to be connected, the end portion 52, a door lock switch 53 which is a button to lock a door of the vehicle 1 wirelessly, a door unlock switch 54 which is a button to unlock the door of the vehicle 1 wirelessly and the transponder 55 which communicates with a below-described ECU 14 via the antenna 41. The valet key 5 in this preferred embodiment is a portable device without having a mechanical key, and is a dedicated valet key. Furthermore, the valet key 5 may be configured to unlock the door by placing a hand over a door knob of a vehicle or to lock the door by pressing a switch of the door knob while carrying the valet key 5, without providing a door lock switch 53 or a door unlock switch 54.

The opening 51 of the valet key 5 may be, for example, in a shape which can be hooked on a projection body of a pin or the like for key storage which is provided to a hotel reception, thus, it is not limited to an opening and it may be a concave portion not penetrating the main body 50 to which the locking bar 44 is freely insertable, for example.

The transponder 55 is schematically configured to comprise a non-illustrated CPU (Central Processing Unit) and a memory unit to store an ID or the like. Furthermore, the transponder 55 periodically communicates with the ECU 14 via the antenna 41 and the antenna 15 of the valet key storage device 4, and based on this communication, the ECU 14 verifies whether or not the valet key 5 is stored in the valet key storage device 4. For example, when the communication between the valet key storage device 4 and the valet key 5 becomes impossible even though the authentication operation by the immobilizing function is not conducted yet, namely, when the valet key 5 is taken out from the valet key storage device 4 illegally, the ECU 14 controls the vehicle 1 so as not to accept any operations by the valet key 5.

(Control System of the Valet Key Storage Device)

In FIG. 4, the valet key 5 is configured to comprise a antenna 41, a capacitor circuit 24 which obtains direct-current voltage rectifying electromotive force induced by the antenna 41, an electrolytic capacitor 25 to charge the output power of the capacitor circuit 24 and a transponder 55 activated by a power charged in the electrolytic capacitor 25 as a power source.

The transponder 55 is configured to store an ID code of the valet key 5 and to transmit the ID code using a power charged in the electrolytic capacitor 25 by the capacitor circuit 24 as a power source when more than predetermined power is charged.

On the valet key storage device 4 side, while the valet key 5 is removable and incorporable, a solenoid 45a, an antenna 15, an ECU 14, an EEPROM (Electronically Erasable and Programmable Read Only Memory) 14a in which a vehicle side ID is stored, a cylinder switch 22 connected to the ECU 14, an amplifier 16 for amplifying a signal (an ID code) received by the antenna 15 and a flux generating circuit 17 for outputting a power signal to the antenna 15 are provided.

Operation of the First Preferred Embodiment

Operation of the valet key storage device 4 in the first preferred embodiment will be explained in more detail in conjunction with FIG. 1 to FIG. 4 and below-described FIG. 5 and FIG. 6.

Figures 5A, 5B:
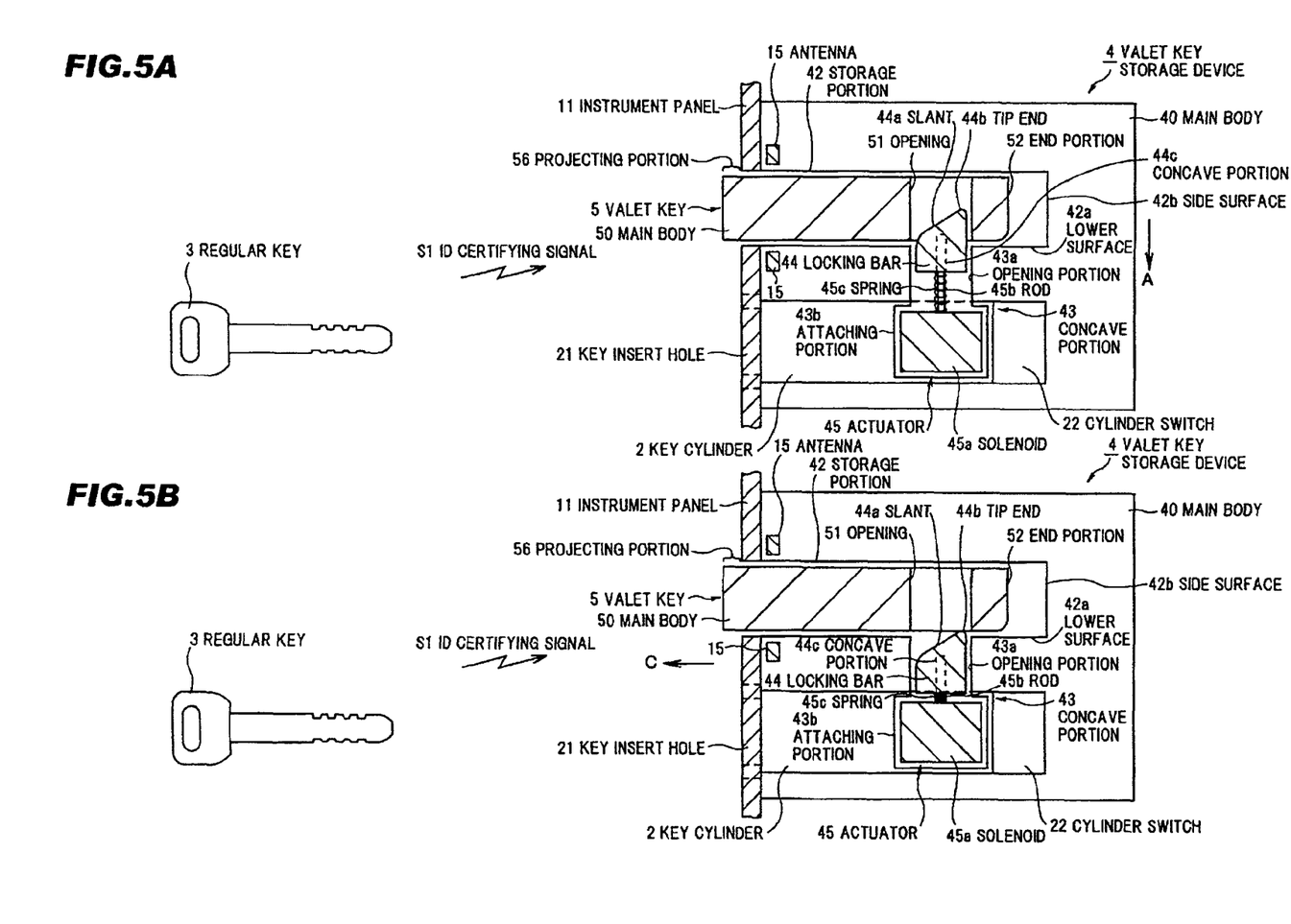
Figure 6:
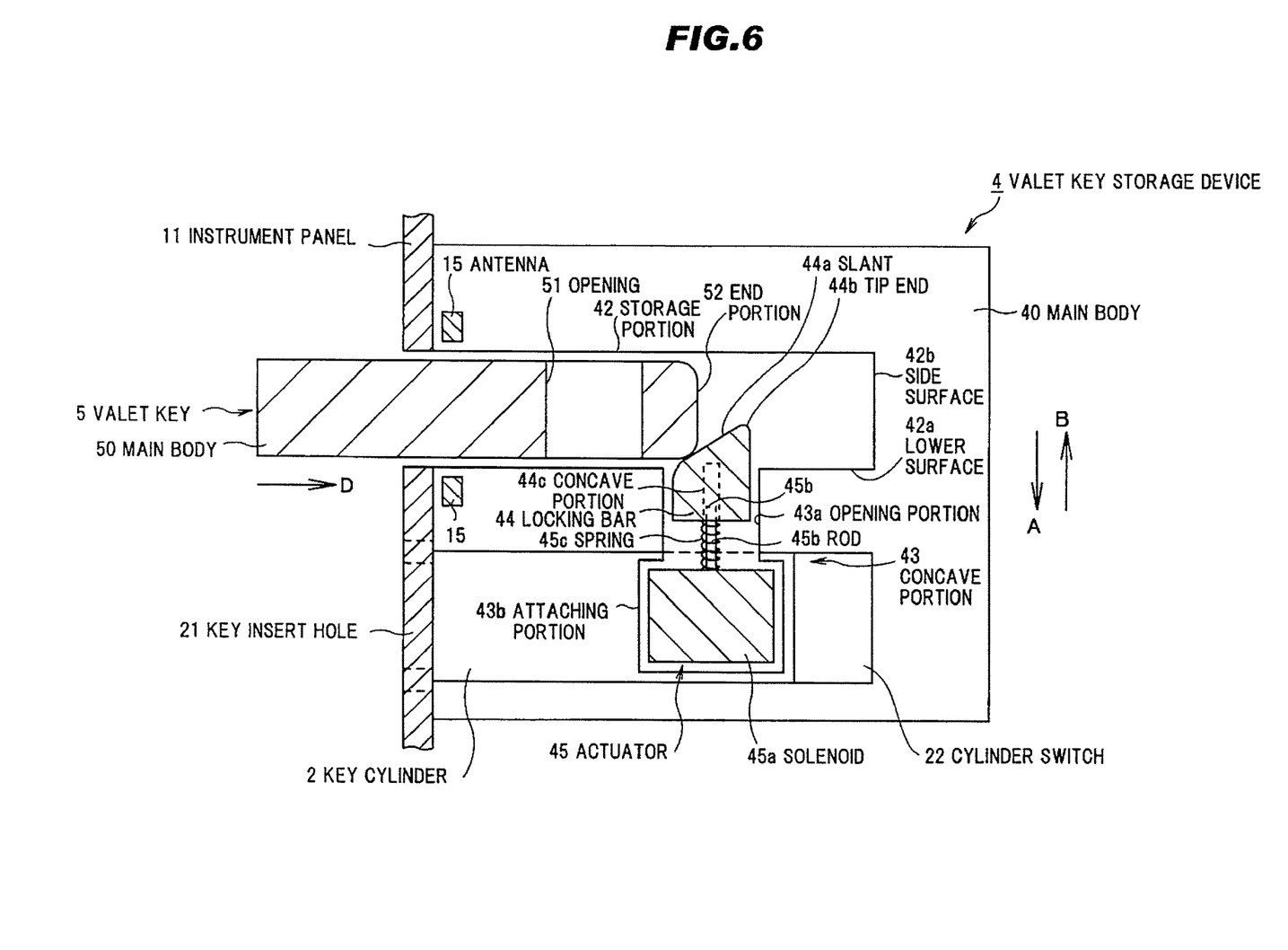
FIG. 6 is a cross sectional view of the valet key storage device in the first preferred embodiment according to the present invention when storing the valet key.

FIGS. 5A and 5B are cross sectional views of the valet key storage device in the first preferred embodiment according to the present invention, wherein FIG. 5A is before an ID certification and FIG. 5B is after the ID certification, and FIG. 6 is a cross sectional view of the valet key storage device in the first preferred embodiment according to the present invention when storing the valet key.

(Ejecting Operation of the Valet Key 5)

When a driver gets into the vehicle 1 with the regular key 3 and rotates the regular key 3 in a predetermined direction after inserting into the key insert hole 21 of the valet key storage device 4, a valet key ejection signal is output to the ECU 14 from the cylinder switch 22. Furthermore, the antenna 15 receives an ID certifying signal S1 transmitted from the regular key 3 and the ECU 14 which has received the ID certifying signal S1 certifies the ID of the regular key 3 and the ID of the vehicle 1 with reference to the ID of the vehicle 1 in the EEPROM 14a. When the ID is certified, a control code is transmitted to the valet key 5 via the antenna 15 and the antenna 41, and then, a valet function is imparted to the valet key 5.

When the IDs of the regular key 3 and the vehicle 1 match and a valet key ejection signal is output from the cylinder switch 22, the ECU 14 controls the actuator 45 of the valet key storage device 4 and displaces the locking bar 44 in the arrow A direction shown in FIG. 5A until the locking bar 44 comes out from the opening 51 of the valet key 5. The ECU 14 controls the actuator 45 and displaces the locking bar 44 in the arrow B direction as shown in FIG. 6 when the valet key 5 is taken out from the valet key storage device 4 and the vehicle 1 is operated, however, it is not limited thereto, it may be displaced in the arrow B direction after the valet key 5 is inserted into the storage portion 42 of the valet key storage device 4, and it is not limited thereto, neither The driver pulls out the valet key 5 in an arrow C direction shown in FIG. 5B holding a projecting portion 56 of the valet key 5 shown in FIG. 2 by hand, passes the valet key 5 to the valet attendant, and then, the valet attendant is permitted to conduct a predetermined vehicle operation such as engine start-up by the valet key 5 to which the valet function has been imparted. The valet key 5 may be configured to project in an C direction by a force of a spring without providing the projecting portion 56.

(Store Operation of the Valet Key 5)

When inserting the valet key 5 into the storage portion 42 of the valet key storage device 4 in the arrow D direction shown FIG. 6 from the end portion 52, the end portion 52 of the valet key 5 contacts with the slant 44a of the locking bar 44 as shown in FIG. 6, the locking bar 44 is pushed in the arrow A direction and burrows into the lower surface of the valet key 5 shrinking the spring 45c. When further pushing the valet key 5 in the arrow D direction, since the spring load is applied to the locking bar 44 in the arrow B direction by the spring 45c, the tip end 44b of the locking bar 44 enters the opening 51 and the locking bar 44 enters further into the opening 51 by further pushing the valet key 5 as shown in FIG. 2. Even if trying to pull out the valet key 5 in the arrow C direction holding the projecting portion 56 of the valet key 5 in this state, the opening 51 of the valet key 5 does not contact with the slant 44a of the locking bar 44 but does contact with a surface of the locking bar 44 vertical to the arrow C direction, thus, it is not possible to pull out the valet key 5 and the valet key 5 is securely stored in the vehicle.

Effect of the First Preferred Embodiment (1) According to the above-mentioned first preferred embodiment, since it is possible to store the valet key 5 in the vehicle 1 securely, the driver does not need to carry around an extra valet key 5.

(2) Since it is possible to store the valet key 5 as a dedicated key in the valet key storage device 4, the shape does not have a notched portion unlike a conventional key, furthermore, since the valet key 5 has the opening 51, a storage property at a hotel reception or the like is good and the appearance is also good as various decorations are possible.

(3) Even though the valet key 5 is taken out from the valet key storage device 4 by improper means, ID certification by the regular key 3 is not conducted, thus, the control code is not transmitted to the valet key 5 via the antenna 41 and the valet function is not imparted to the valet key 5. As a result, security of the storage is improved.

(4) In this embodiment, since double-lock, an operation of the key cylinder 2 using the regular key 3 and the ID certification, namely, mechanical and electronic lock, is applied, the security is greatly enhanced.

Second Preferred Embodiment

Figure 7:
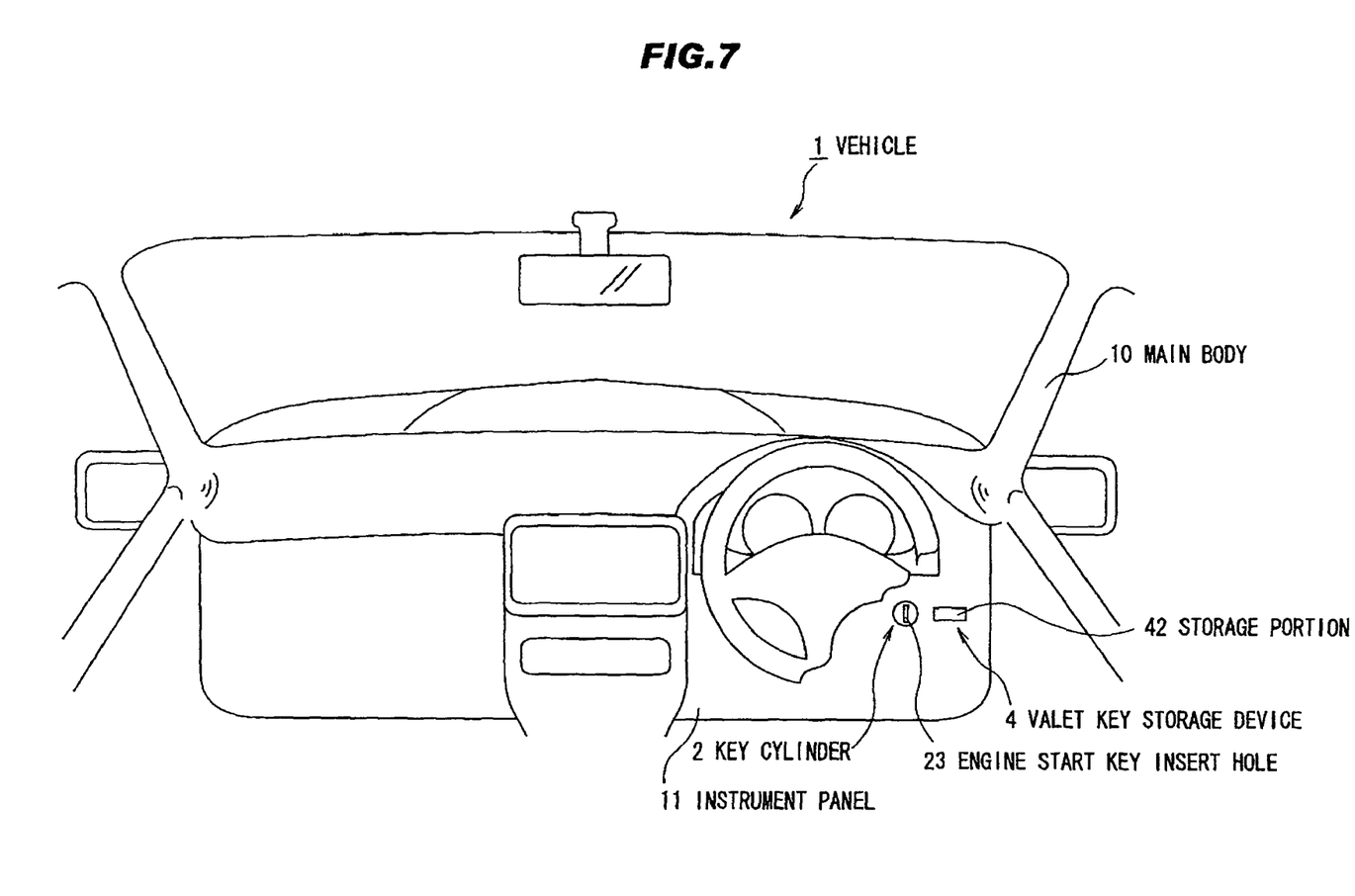
FIG. 7 is a schematic view of the inside of a vehicle in a second preferred embodiment according to the present invention.

FIG. 7 is a schematic view of the inside of a vehicle in a second preferred embodiment according to the present invention. In the second embodiment, the key cylinder 2 is configured to be used also for starting up the engine by arranging the valet key storage device 4 near an engine start key insert hole 23. Similar to the first embodiment, the cylinder switch 22 for outputting the valet key ejection signal to the ECU 14 is installed with an ignition switch to the key cylinder 2 for starting up the engine. Other configurations and operations are same as the first embodiment.

Effect of the Second Embodiment

According to the above-mentioned second preferred embodiment, in addition to the effect of the first embodiment, it is possible to reduce the cost since it is possible to use the key cylinder 2 as common parts.

It should be noted that the present invention is not intended to be limited to the above-mentioned embodiments, and the various kind of changes thereof can be implemented without departing from the gist of the invention. For example, the key cylinder 2 may be released by a mechanical release operation to release the locking mechanism mechanically transmitting the release operation by the key cylinder 2 to the locking bar 44 besides releasing the rocking mechanism by driving the solenoid 45a by the release signal output from the cylinder switch 22.

What is claimed is:
1. A valet key storage device housed in a vehicle having an engine comprising:
  a valet key for unlocking doors of the vehicle and starting the engine;

a mechanical vehicle key for unlocking doors of the vehicle and starting the engine;

a valet key storage portion for storing the valet key on which an engaging portion is formed;

a locking portion provided with a locking mechanism for locking an ejection of the valet key by engaging with the engaging portion of the valet key;

a key cylinder for conducting a release operation of the locking mechanism by the mechanical vehicle key; and a control section for controlling an unlocking operation of the locking portion based on the release operation of the locking mechanism by the mechanical vehicle key when an ID possessed by the mechanical vehicle key matches an ID of the vehicle.

2. The valet key storage device according to claim 1, wherein the locking portion has a locking bar provided corresponding to the engaging portion of the valet key so as to lock an ejection of the valet key from the valet key storage portion by entering the engaging portion of the valet key when the valet key is stored in the valet key storage portion, and a driving section for driving the locking bar.

3. The valet key storage device according to claim 1, wherein the engaging portion of the valet key comprises a concave portion or an opening portion by which the valet key can be hooked onto an external projection body.

4. The valet key storage device according to claim 2, wherein the control section controls the driving section when the ID possessed by the mechanical vehicle key matches the ID of the vehicle so as to permit the ejection of the valet key from the valet key storage portion.

5. The valet key storage device according to claim 2, wherein the driving section is an actuator in which a solenoid is used.

6. The valet key storage device according to claim 2, wherein the locking bar has a slant which converts a force in a direction to store an end portion of the valet key into a force in a orthogonal direction when the valet key is stored in the storage portion.

7. The valet key storage device according to claim 4, wherein the control section imparts a valet function to the valet key when the ID possessed by the mechanical vehicle key matches the ID of the vehicle.

8. The valet key storage device according to claim 2, wherein the control section controls the driving section such that, when the ID possessed by the mechanical vehicle key matches the ID of the vehicle, a valet key ejection signal is outputted from a cylinder switch of the key cylinder based on the release operation of the locking mechanism by the mechanical vehicle key to displace the locking bar so as to allow the locking bar to release from the engaging portion of the valet key.

9. The valet key storage device according to claim 4, wherein the control section displaces the locking bar in a projecting direction by controlling the driving section when the valet key is taken out from the valet key storage portion and the vehicle is operated.

10. The valet key storage device according to claim 5, wherein the solenoid comprises a rod stored inside the solenoid and a spring arranged around the rod for imparting an spring load in a direction of the locking bar.

* * * * *